US011906918B1

(12) United States Patent
Cohen et al.

(10) Patent No.: US 11,906,918 B1
(45) Date of Patent: Feb. 20, 2024

(54) PRINTER DRUM REMOVAL PREPARATION

(71) Applicant: Hewlett-Packard Development Company, L.P., Spring, TX (US)

(72) Inventors: Lavi Cohen, Nes Ziona (IL); Yossi Yaacobov, Nes Ziona (IL); Tomer Bunker, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/065,884

(22) Filed: Dec. 14, 2022

(51) Int. Cl.
*G03G 15/00* (2006.01)
*G03G 21/16* (2006.01)

(52) U.S. Cl.
CPC ......... *G03G 15/50* (2013.01); *G03G 21/1671* (2013.01)

(58) Field of Classification Search
CPC .. G03G 15/50; G03G 21/007; G03G 21/0094; G03G 21/1671; G03G 21/168
See application file for complete search history.

(56) References Cited

U.S. PATENT DOCUMENTS

| | | | | |
|---|---|---|---|---|
| 11,170,273 B2* | 11/2021 | Yokomizo | ............ | B41J 2/17566 |
| 2010/0303480 A1* | 12/2010 | Stuckey | ............... | G03G 15/553 399/26 |
| 2013/0129371 A1* | 5/2013 | Okanishi | ............... | G03G 21/14 399/75 |

* cited by examiner

*Primary Examiner* — Hoang X Ngo

(57) ABSTRACT

In an example, a printing apparatus may include, a rotatable shaft, a removable drum mounted on the shaft and a fixing element to fixedly couple the removable drum to the shaft, so that the removable drum is to rotate with the shaft. The printing apparatus may also include a heater, a printing apparatus satellite component located adjacent to the removable drum and engageable with the removable drum and a controller. The controller may be to receive a command to prepare the removable drum for removal; and in response, control the shaft to rotate the removable drum; control the heater to heat the removable drum while it rotates; and control the printing apparatus to engage the satellite component of the printing apparatus with the removable drum while it rotates.

15 Claims, 8 Drawing Sheets

PRINTER DRUM REMOVAL PREPARATION

BACKGROUND

Some print apparatus apply print agents such as inks or toners directly to a substrate such as paper, card, plastic metal and the like in a pattern to form an image (which may comprise any combination of text, pictures, patterns and the like) on the substrate. Other print apparatus form patterns of print agents, such as printing fluids on an image forming member and apply the formed patterns of print agents to a substrate. In electrophotographic printing, which may include Liquid Electrophotographic Printing (LEP), an image is first formed in toner (or in the case of LEP, electronic printing fluid) on an electrostatic plate bearing a charge pattern corresponding to the image to be formed. The pattern may then be transferred to an intermediate transfer member in a first transfer, and then transferred to a substrate in a second transfer. In some examples, the pattern may be transferred to the intermediate transfer member under an applied voltage and an applied force. The pattern may then be transferred from the intermediate transfer member to the substrate by application of pressure between the intermediate transfer member and the substrate by an impression drum.

In some print apparatus, the electrostatic plate may be a cylindrical photoconductor drum fixedly mounted on a shaft. The cylindrical photoconductor drum may be removable from the print apparatus so that it can be maintained, or replaced when it reaches the end of its lifespan, or to allow other press systems maintenance.

BRIEF DESCRIPTION OF THE DRAWINGS

Non-limiting examples will now be described with reference to the accompanying drawings, in which.

DETAILED DESCRIPTION

Figure 1:
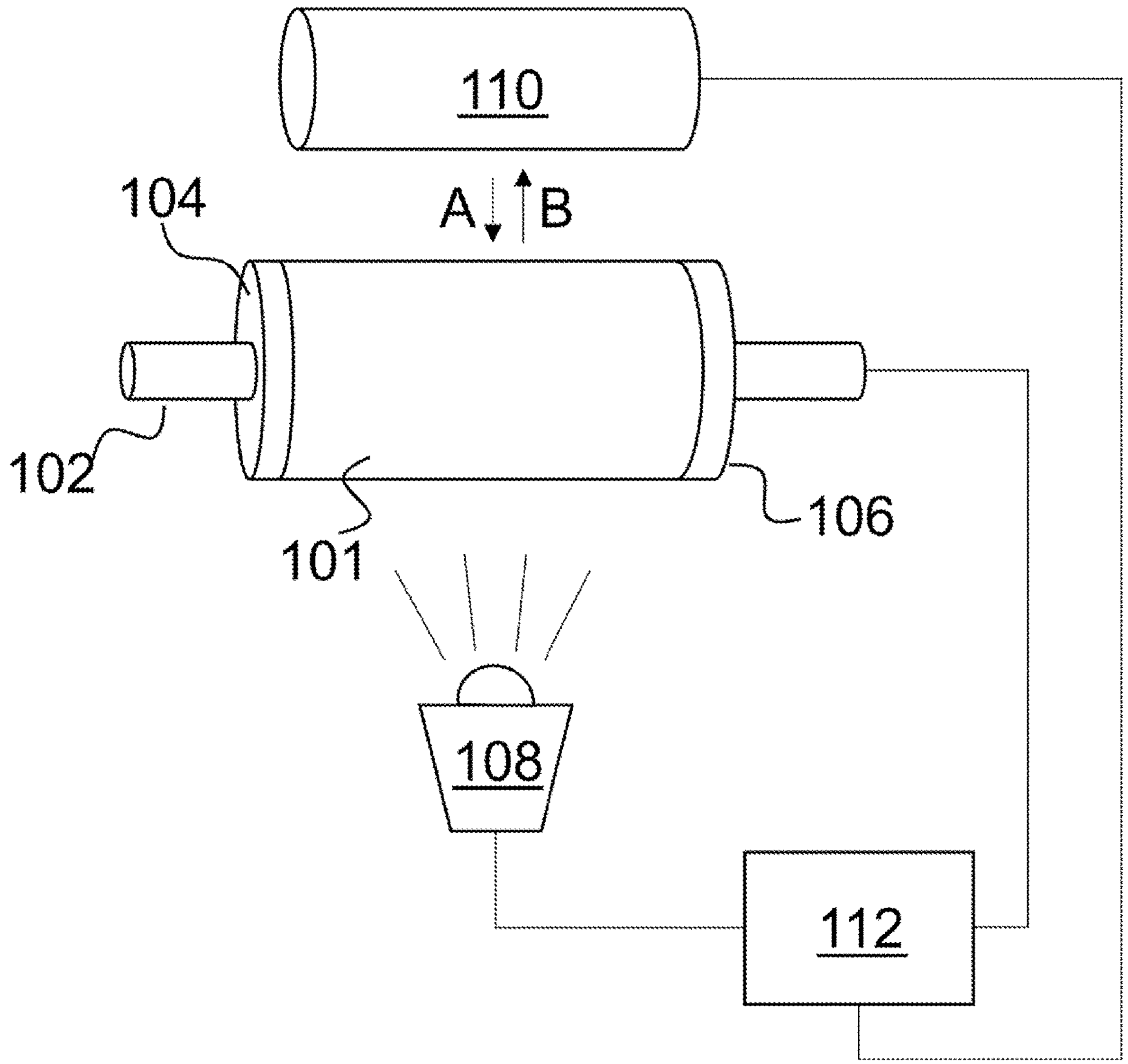
FIG. 1 shows a schematic representation of an example printing apparatus.

FIG. 1 shows a printing apparatus 100, which may comprise a printer, or part of a printer, e.g., an LEP printer. The apparatus 100 comprises a removable drum 101 mounted on a rotatable shaft 102. In some examples, the removable drum may be e.g., an ITM drum, a photoconductor drum, or another printing apparatus drum. In the example printing apparatus 100 shown in FIG. 1, the removable drum 101 is a photoconductor drum. The photoconductor drum 101 is held in place with a fixing element to fixedly couple the photoconductor drum to the shaft so that the photoconductor drum is to rotate with the shaft. In the example of FIG. 1, the photoconductor drum 101 is held in place with a plurality of fixing elements 104, 106 comprising a front cap 104 and a rear cap 106. In some examples, another type of fixing element or fixing elements suitable to fixedly hold the photoconductor drum 101 in place on the shaft 102, may be used. When the photoconductor drum 101 is mounted on the shaft 102 with the caps 104 and 106 in place, the photoconductor drum 101 is fixedly mounted on the shaft 102 so that when the shaft 102 rotates, the rotation is transmitted to the photoconductor drum 101. In the example of FIG. 1 the photoconductor drum 101 can be removed from shaft 102, e.g., when the photoconductor drum 101 is to be replaced. To replace the photoconductor drum 101, for example, the front cap 104 may be disengaged from the photoconductor drum 101 and removed from the shaft 102, enabling the photoconductor drum 101 to be disengaged from the rear cap 106 to remove the photoconductor drum 101 from the shaft 102. For example, the front cap 104 may include a handle or handles to enable a user to pull the front cap 104 off the photoconductor drum 101. The photoconductor drum 101 can then be pulled to separate it from the rear cap 106 and remove it from shaft 102.

The photoconductor drum 101 is formed of a frame with an outer surface formed of a photoconductive material. For example, the photoconductor drum 101 may be formed of a hollow cylindrical frame formed of e.g., aluminium, with a photoconductive material such as an amorphous silicon layer as an outer coating formed on an external surface of the cylinder. In some examples, other suitable materials may be used for the photoconductive material, for example an organic photoconductor (OPC).

The photoconductor drum 101 may engage with the fixing elements 104, 106 with a frictional contact between the photoconductor drum 101 and the fixing elements 104, 106. The engagement between the photoconductor drum 101 and the fixing elements 104, 106 enables rotation of the shaft 102 to be transmitted to the photoconductor drum 101 without causing slippage of the photoconductor drum relative to the shaft. If the photoconductor drum 101 slips during rotation, this can reduce print quality. In some examples, the fixing elements 104, 106 may be formed from steel. In some examples, the fixing elements 104, 106 may be formed from another suitable material. The fixing elements 104, 106 and/or the shaft 102 may also comprise a locking arrangement to lock the caps in place axially on the shaft and fixedly coupling the fixing elements 104, 106 to the shaft 102. In some examples, the caps 104, 106 may include a biasing mechanism, e.g., a spring, to lock the caps 104, 106 in place relative to the photoconductor drum 101.

Figure 2A:
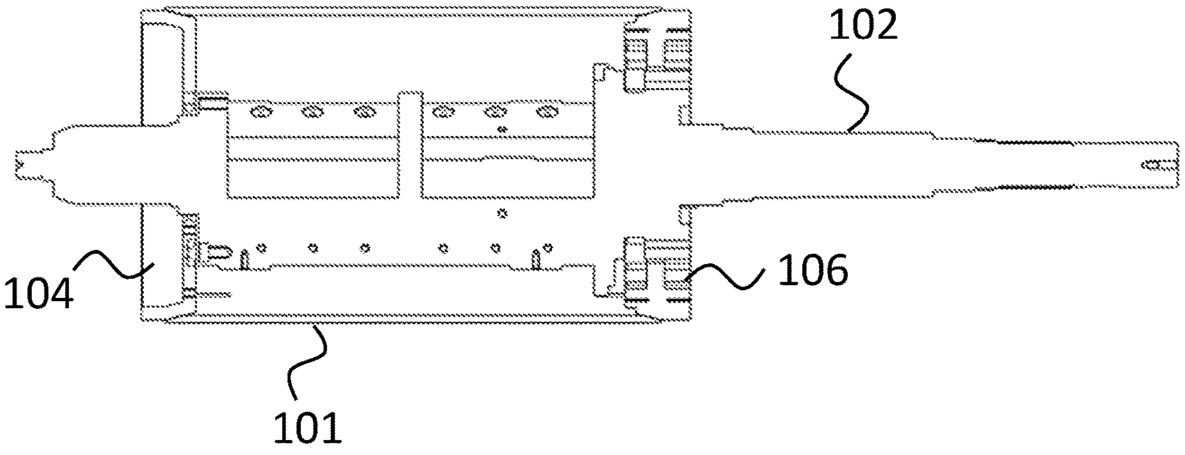
FIG. 2A shows a cross-section representation of part of an example printing apparatus, which may be part of the example printing apparatus of claim 1.

FIG. 2A shows a cross-section representation of part of an example printing apparatus, which may be printing apparatus 100 of FIG. 1. FIG. 2A shows removable drum 101, which may be a removable photoconductor drum. The removable drum 101 is mounted on rotatable shaft 102, with fixing elements comprising front end cap 104 and rear end cap 106. When the end caps 104, 106 are fixed in place, e.g. with a suitable locking mechanism, the removable drum 101 is fixedly attached to the rotatable shaft 102 so that rotation of the shaft 102 is transmitted to the drum 101, without slippage of the drum 101. To remove the drum 101, the end caps 104, 106 may be unlocked from the drum 101 for removal of the first end cap 104 and then removal of the drum 101 from the printing apparatus 100.

The lifespan of the photoconductor is shorter than the lifespan of the printing apparatus 100 and therefore the photoconductor drum 101 is effectively a consumable that will be replaced from time to time. Providing a frictional fit between the photoconductor drum 101 and the fixing elements 104, 106, reduces slippage of the photoconductor drum 101, thereby improving print quality. However, when the frictional force between the photoconductor drum 101 and the fixing elements 104, 106 is high enough to prevent slippage, this can make it difficult to remove the photoconductor drum 101 from the printing apparatus 100 without causing damage to other parts of the printing apparatus 100. This effect is referred to as "binding" between the photoconductor drum 101 and the fixing elements 104, 106.

Furthermore, if the photoconductor drum 101 has an uneven temperature cooling rate along the contact area between the caps and drum, this can increase the likelihood and severity of binding occurring, as this can cause expansion or contraction of parts of the photoconductor drum 101, which can cause the interference fit between the photoconductor drum 101 and the fixing elements 104, 106 to become even tighter. Uneven temperature in the photoconductor drum 101 can be caused by uneven heating or cooling of the photoconductor drum 101. For example, certain areas around the photoconductor drum 101 may have higher temperatures than other areas. When a printing process is finished, rotation of the photoconductor drum 101 may cease, causing some areas to cool down slower than others due to being adjacent to warmer areas of the printer.

Figure 2B:
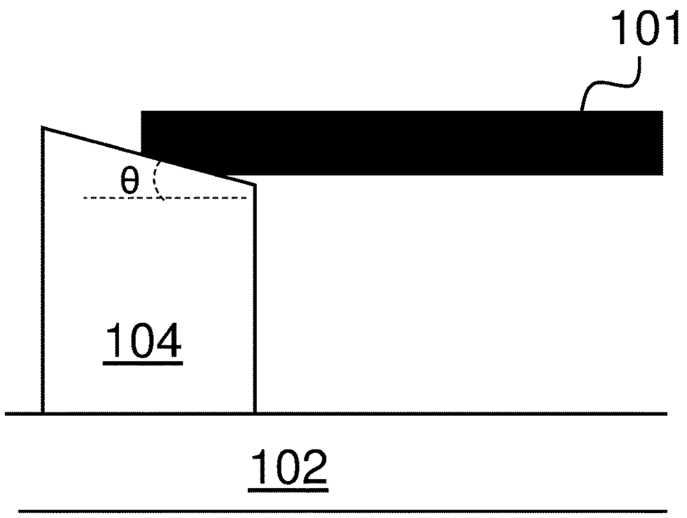
FIG. 2B shows a schematic representation of part of an example printing apparatus, which may be part of the example printing apparatus of claim 1.

In some examples, the frictional contact between the photoconductor drum 101 and the fixing elements may comprise a tapered contact area. I.e., a surface of the caps 104, 106 that contacts and engage a surface of the photoconductor drum 101 to fix the cap in place relative to the photoconductor drum 101, is tapered. In the example of FIG. 2B, a first side of each cap to be located within the photoconductor drum 101 has a smaller diameter and a second side of each cap to be located outside the photoconductor drum 101 has a larger diameter, with a taper therebetween. In some examples a taper angle θ may be between 10° and 30°. In some examples, the taper angle may be e.g., 15°. The photoconductor drum 101 may be formed with a corresponding taper angle formed in a wall of the photoconductor drum 101 such that the thickness of the photoconductor drum 101 reduces at an end of the drum. In some examples, each end of the photoconductor drum 101 comprises a tapered section and each fixing element 104, 106, has a corresponding taper. In some examples, other shapes of contact areas may be used to engage a fixing element or fixing elements with the photoconductor drum 101.

The printing apparatus 100 further comprises a heater 108. In the example shown in FIG. 1, heater 108 is an external heater, e.g., a heat lamp. However, in some examples, the heater may comprise a hot blanket (i.e., ITM) which may be heated to a temperature of between 80° C. and 100° C. and then engaged with the photoconductor drum 101. In some examples, the heater may comprise a cleaning station of the printing apparatus 100 which may be supplied with hot imaging oil and then engaged with the photoconductor drum 101.

The printing apparatus 100 further comprises a satellite component 110, wherein a satellite component is a component located adjacent to the removable drum 101 and engageable with the removable drum 101. In the example of FIG. 1, component 110 is moveable in the direction of arrows A and B. I.e., the component 110 can be moved towards the drum 101 in direction A to contact and apply pressure to the drum 101 and can be moved away from the drum 101 in direction B to disengage from the drum 101. In some examples, the engagement between the component 110 and the drum 101 may be effected by moving the drum 101 towards the component 110. In some examples, the component 110 is an intermediate transfer member (ITM) support, to engage the intermediate transfer member (blanket) with the photoconductor drum 101. For example, the ITM may be a belt or may be wrapped around a cylindrical drum or a plurality of cylindrical drums. The ITM support may be e.g., an ITM drum or a blanket backing roller. During a printing operation, the ITM support is to urge an ITM, also referred to as a blanket, against the photoconductor drum 101, engaging the ITM with the photoconductor drum 101 to transfer a pattern of print agent from the photoconductor drum 101 to the ITM. The ITM support may be a drum with a blanket wrapped around the drum, or may be a backing roller, or a plurality of backing rollers which are to engage a blanket belt against the photoconductor drum 101. In some examples, the component 110 may be another satellite component of the printing apparatus 100 located adjacent to the photoconductor drum 101, that is engageable with the photoconductor drum 101, for example, a cleaning station, a binary ink developer (BID), or a charge roller. In some examples, a plurality of satellite components located adjacent to the photoconductor drum 101 may be engageable with the photoconductor drum 101.

The printing apparatus 100 further comprises a controller 112. The controller 112 may be e.g., processing circuitry, or a processor in association with a machine-readable medium, e.g., as described below in more detail. The controller 112 may be in wired or wireless communication with other parts of the printing apparatus 100 and may be to trigger actuators in order to control parts of the printing apparatus 100 to move. For example, controller 112 is to control or trigger rotation of shaft 102, and control or trigger component 110 to move towards and engage photoconductor drum 101. In some examples, the controller may be to control the photoconductor drum 101 to engage with component 110 by moving the photoconductor drum 101 towards the component 110.

The controller 112 may be to receive a command to prepare the photoconductor drum 101 for removal. In some examples, the command may be received from a user input. In some examples, the command may be automatically generated, e.g., after the photoconductor drum 101 has been in service for a predefined amount of time or a predefined number of print jobs, or after an indication that the photoconductor is reaching the end of its lifespan (e.g., in response to detecting a reduction in print quality).

The controller 112 is to, in response to receiving the command to prepare the photoconductor drum 101 for removal, initiate a photoconductor drum removal sequence. The controller 112 is to control the shaft 102 to rotate the photoconductor drum 101 and control the heater 108 to heat the photoconductor drum 101 while it rotates. In some examples, the heater is to heat the photoconductor drum 101 to a temperature between 35° C. and 55° C. The printing apparatus 100 may include a sensor e.g., a temperature sensor, to determine that the photoconductor drum 101 has reached the target temperature. The temperature sensor may be, e.g., an infra-red sensor, or a plurality of infra-red sensors. In some examples, the temperature may be determined on a section of the photoconductor drum 101. E.g., a temperature sensor may be located at a fixed axial distance along the drum and may measure a plurality of temperature readings around the drum circumference as the drum rotates. In some examples the temperature may be determined on a plurality of sections of the photoconductor drum 101, e.g., by using an array of temperature sensors spaced along the axial direction of the drum. In some examples, another type of temperature sensor may be used, such as a thermal camera, which may give a continuous measurement of temperature all around the drum at once.

Heating the photoconductor drum 101 while rotating it, produces an even temperature along the rotation direction of the photoconductor drum 101 which can reduce the likelihood and severity of binding occurring and thereby enable the photoconductor drum 101 to be more easily removed from the printing apparatus 100. Heating the photoconductor drum 101 can also cause the photoconductor drum 101 to expand, which can reduce a frictional binding between the photoconductor drum 101 and the fixing elements 104, 106 and make the photoconductor drum 101 easier to remove from the printing apparatus 100.

The controller 112 is further to control the printing apparatus 100 to engage the component 110 with the photoconductor drum 101 as the photoconductor drum 101 rotates. The controller 112 may control the component 110 to engage the photoconductor drum 101 while heating the photoconductor drum 101, or after heating the photoconductor drum 101.

In some examples, the controller 112 may control the component 110 to continuously engage the photoconductor drum 101. Continuously engaging the component 110 with the photoconductor drum 101 may comprise urging the component 110 against the photoconductor drum 101 while the photoconductor drum 101 rotates through at least one full rotation, or a plurality of rotations. This continuous engagement may also be referred to as “ironing”.

Ironing the photoconductor drum 101 in this way creates a uniform contact pressure in the contact area and thereby reduces the severity of the binding and enables the photoconductor drum 101 to be more easily removed from the printing apparatus 100. Ironing the photoconductor drum 101 can also create a uniform contact area between the photoconductor drum 101 and the fixing elements 104, 106, e.g., over the area of the contact areas between these parts, e.g., the tapered area shown in FIG. 2B. Therefore, a frictional force between the contact parts is evenly distributed, preventing some areas forming binding locations.

In some examples, the component 110 is an ITM support, such as an ITM drum or a backing roller and the controller 112 is to control the ITM support to continuously engage the photoconductor drum 101 while it rotates. Controlling the ITM support to engage the photoconductor drum 101 as part of a photoconductor drum removal sequence may be useful, as the ITM support is already to exert a high pressure on the photoconductor drum during printing. For example, the ITM support can be controlled to exert a pressure of e.g., 100-600 N on the nip area between the photoconductor drum 101 and the ITM support. Therefore, the removal sequence can be performed effectively without providing additional satellite components to the printing apparatus 100.

In some examples, another component may be used to continuously engage the photoconductor drum 101, for one or a plurality of full rotations of the photoconductor drum 101. For example, a cleaning station, BID etc.

In some examples, the controller 112 is to apply a series of engagements between the photoconductor drum 101 and a component, which may be component 110 or may be a separate component that is also located adjacent to the photoconductor drum 101 and engageable with the photoconductor drum 101. In some examples, a plurality of satellite components may each be controlled to apply a series of engagements with the photoconductor drum 101. The series of engagements may be a plurality of brief engagements in a sequence to provide a short impact, bump, or knock to the photoconductor drum. Including these brief impacts in the removal sequence can help to unbind the photoconductor drum 101 from the fixing elements 104, 105 at any sites where these are stuck together due to friction, thereby enabling easier removal of the photoconductor drum 101. In some examples, the controller 112 may control one or a plurality of components to perform a series of engagements or “knocks” on part of a fixing element, or fixing elements 104, 106. For example, the series of engagements may comprise a sequence of impacts that may loop. For example, a first component may be controlled to impact the drum, then disengage and after a pause (e.g. 1 second) a second component may be controlled to impact the caps 104, 106. This pattern may then loop or repeat e.g. for a predetermined amount of impacts or for a predetermined amount of time. In some examples, a cleaning station component may be aligned with the photoconductor drum 101 so that it follows or “rides” the caps 104, 106 when it engages with the photoconductor drum 101 so that engaging the cleaning station for a brief contact results in an impact on the caps 104, 106.

Figure 3:
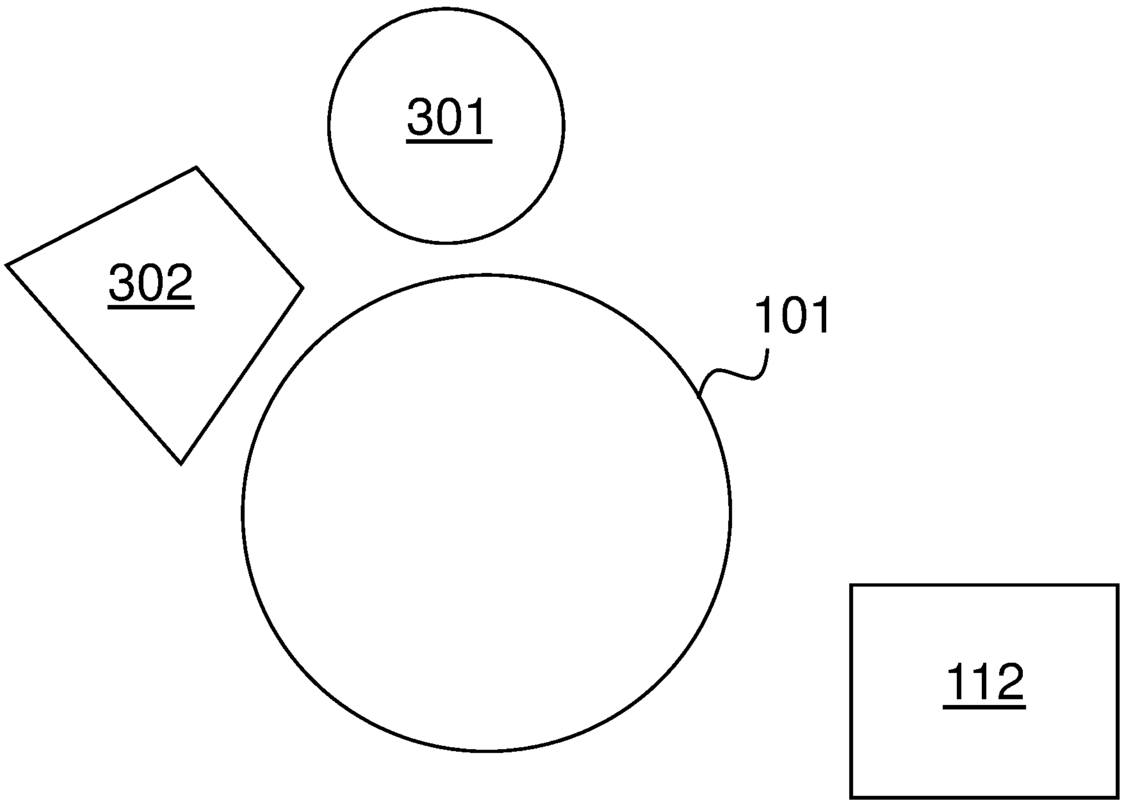
FIG. 3 shows a schematic representation of part of an example printing apparatus.

FIG. 3 shows a part of a printing apparatus, e.g., the printing apparatus 100 of FIG. 1, viewed from one end of the removable drum 101. FIG. 3 shows a removable drum 101, which in this example is a photoconductor drum 101. with the example printing apparatus 100 also includes an ITM support 301 which can be e.g., an intermediate transfer member drum or a backing roller, which is engageable with the photoconductor drum 101 to perform an image transfer during a printing operation. Example printing apparatus 100 also includes a cleaning station 302 which is also engageable with the photoconductor drum 101, to clean the photoconductor drum 101. Once the photoconductor drum 101 is heated to a predefined threshold temperature, for example a temperature between 35° C. and 55° C. (e.g. 42° C.) The controller 112 may be to control the printing apparatus 100 to perform a continuous engagement between the photoconductor drum 101 and the ITM support 301. Next, the controller 112 may be to control the ITM support 301 and the cleaning station 302 to apply a series of short engagements on the photoconductor drum 101 and/or the fixing elements 104, 106. For example, each engagement of the series of engagements may be for less than a full rotation of the photoconductor drum 101. Next, the controller 112 may be to disengage all engageable satellite components from the photoconductor drum 101, then cease rotating the photoconductor drum 101 ready for removal.

In some examples, the controller 112 may be to control the printing apparatus 100 to perform a binding prevention sequence. The binding prevention sequence may comprise disengaging all surrounding components from the photoconductor drum surface and rotating the photoconductor drum 101 at a speed of less than or equal to the nominal working speed of the photoconductor drum 101 during printing operations. I.e., instead of ceasing rotation of the photoconductor drum 101 after a printing operation is finished or during a break in printing, the photoconductor drum 101 is controlled to continue rotating slower than its nominal working speed in order to prevent uneven cooling of the photoconductor drum 101 from the working temperature during printing operations. As uneven cooling can cause binding between the fixing elements 104, 106 and the photoconductor drum 101, this process can prevent binding occurring, so that the photoconductor drum 101 is easier to remove. Sometimes, initiation of the binding removal sequence may not be available (e.g. if power to the printing apparatus is lost). Performing the binding prevention sequence in gaps between printing may therefore prevent binding occurring and enable the photoconductor drum 101 to be removed even in these situations.

In some examples, cleaning station 302 further includes a cleaning station cooling system. The controller 112 may be to control the printing apparatus 100 to perform a binding prevention sequence, wherein the binding prevention sequence comprises continuously engaging the cleaning station 302 with the photoconductor drum 101 while rotating the photoconductor drum 101, and simultaneously controlling the cleaning station cooling system to cool the photoconductor drum 101.

For example, the cleaning station cooling system may comprise a system to cool the photoconductor drum 101. In some examples, the cleaning station 302 may be to apply a cooled fluid to the surface of the photoconductor drum 101 to cool the photoconductor drum 101. In some examples, a cooling system may cool a part of the cleaning station 302 so that engagement of the cooled part of the cleaning station 302 with the photoconductor drum 101 is to cool the photoconductor drum 101.

In some examples, the cleaning station 302 may comprise one or a plurality of absorbent parts (e.g. sponges) which are to engage with a surface of the photoconductor drum 101. Furthermore, the printing apparatus may comprise a chilled reservoir (not shown) of imaging oil chilled to below 10° C. (for example to 6° C.). The cooling system may comprise a system to pump cold imaging oil from the chilled reservoir to the cleaning station 302 to wet the absorbent parts with cold imaging oil. The absorbent parts may be to engage with the photoconductor drum 101 when the cleaning station 302 is controlled to engage with the photoconductor drum 101, thereby cooling the photoconductor drum 101 with the cold imaging oil.

Figure 4:
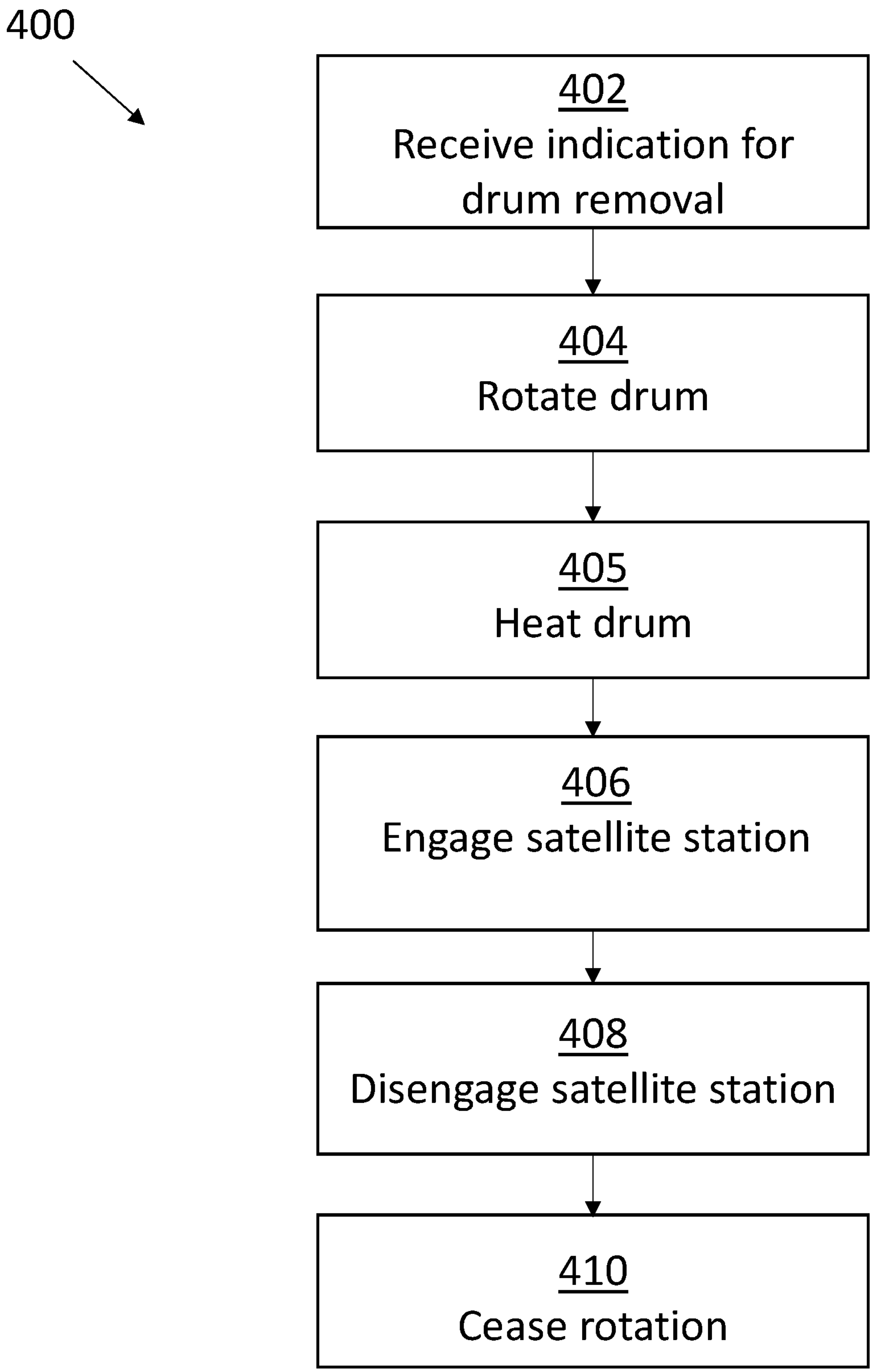
FIG. 4. shows a schematic representation of an example method, which may be a method of preparing a removable drum of a printing apparatus for removal.

FIG. 4 shows a method 400 which may be a method for removal of a removable drum of a printing apparatus. In some examples the method may be a method for removal of a photoconductor drum of a printing apparatus. In some examples, the printing apparatus 100 of FIG. 1 may be to perform the method 400. The method 400 comprises, at block 402, receiving an indication that the removable drum 101 is to be removed from the printing apparatus 100. For example, a controller 112 of the printing apparatus 100 may receive an indication that the removable drum 101 is to be removed (e.g. from a user input) and in response, the controller 112 may initiate a drum removal sequence.

The method 400 comprises, at block 404, controlling the printing apparatus 100 to rotate the removable drum 101. Block 405 comprises controlling a heater 108 to heat the removable drum 101 to a first predefined temperature threshold. In some examples, the first predefined temperature threshold may be above 35° C. In some examples, the first predefined temperature threshold may be above 40° C. In some examples, the first predefined temperature threshold may be a temperature between 35° C. and 55° C., e.g. 42° C. In some examples, the method 400 comprises controlling the removable drum 101 to rotate at a speed of less than or equal to a nominal working speed of the removable drum 101 during printing operations.

Block 406 of method 400 comprises controlling a satellite component 110 of the printing apparatus 100 to engage with the removable drum 101. The satellite component 110 may be e.g., an ITM drum, cleaning station BID, charge roller, or the like. Block 406 comprises controlling one or a plurality of satellite components to either continuously engage the removable drum 101 for a full rotation or a plurality of rotations of the removable drum 101 ("ironing"), and/or briefly engage the removable drum 101, for example with a series of brief impacts.

In some examples, block 406 comprises, once the removable drum 101 has reached the first predefined temperature threshold, performing a series of engagements between a satellite component, or a plurality of satellite components, and the removable drum 101.

Figure 5:
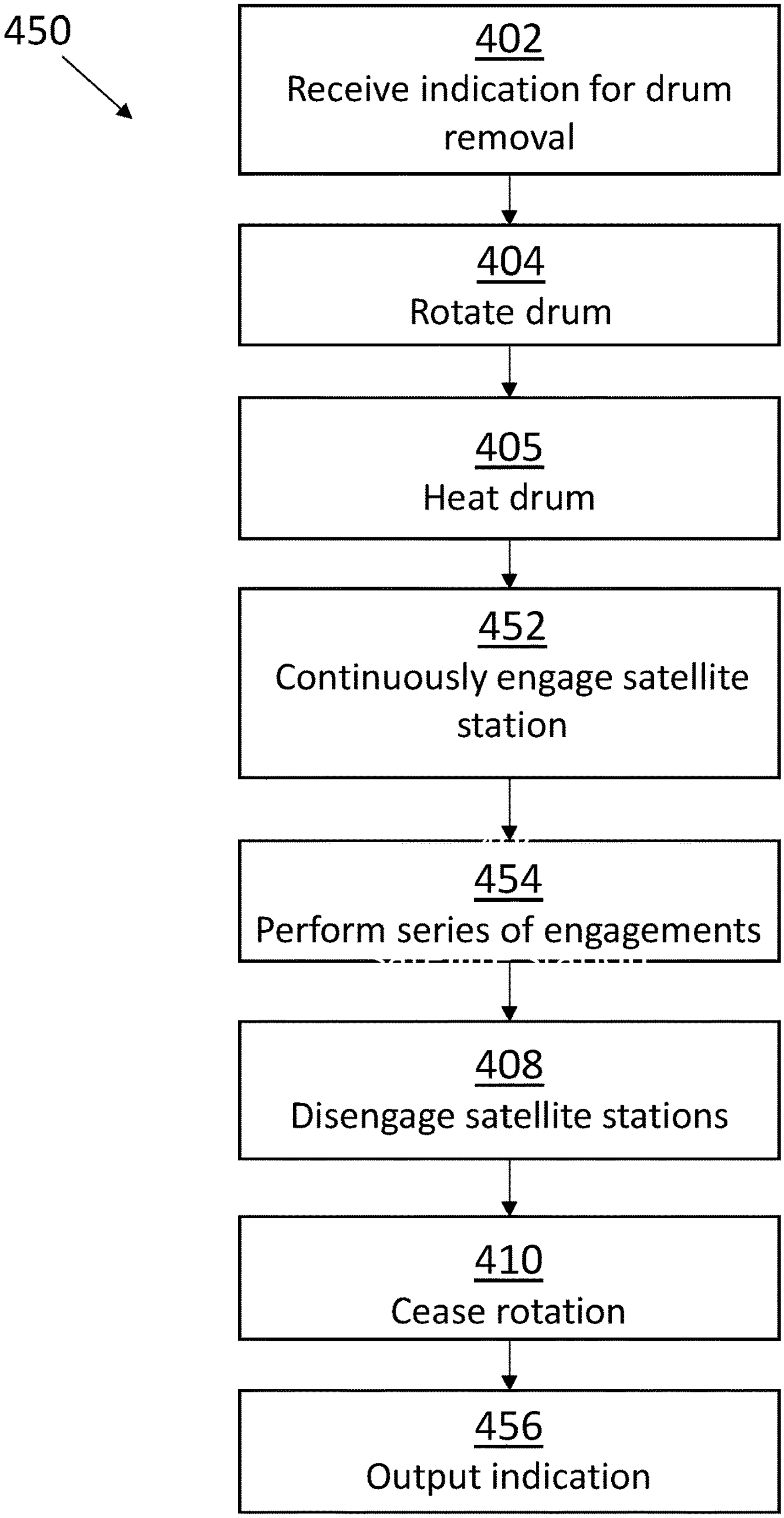
FIG. 5 shows a schematic representation of another example method, which may be a method of preparing a removable drum of a printing apparatus for removal.

In some examples, block 406 comprises a two-stage process, with a first stage comprising performing a continuous engagement with a satellite component (e.g. an ITM support) or a plurality of satellite components located at different positions around the removable drum 101, and a second stage comprising performing a series of engagements between a satellite component, or a plurality of satellite components (e.g. an ITM drum and a cleaning station), and the removable drum 101, for example as shown in FIG. 5.

Block 408 of method 400 comprises controlling a satellite component, or a plurality of satellite components, to disengage from the removable drum 101. Block 410 comprises ceasing rotation of the removable drum 101.

In some examples, after ceasing rotation of the removable drum 101, the method 400 may include outputting a notification that the removable drum 101 is ready for removal. For example, the controller 112 may output a notification which may trigger an external indicator on a user interface to indicate to a user that the removable drum 101 is ready for removal, e.g., by providing an indicator sound, a visual indication, or the like.

FIG. 5 shows a method 450 which may be a method for removal of a removable drum, for example a removable photoconductor drum. Method 405 includes blocks 402 to 405, 408 and 410, as described above in relation to FIG. 4. In addition, method 450 includes blocks 453, 454 and 456.

After blocks 402 to 405, method 405 includes block 452 which comprises performing a continuous engagement with a satellite component (e.g. an ITM drum) or a plurality of satellite components located at different positions around the removable drum 101. For example, the continuous engagement may comprise engaging a photoconductor drum 101 with an ITM support 301, as described above in more detail.

At block 454, method 405 comprises performing a series of engagements between a satellite component, or a plurality of satellite components (e.g. an ITM support and a cleaning station), and the removable drum 101. For example, performing the series of engagements may comprise performing a series of brief impacts on a side of a photoconductor drum 101 with an ITM support 301 and performing a series of brief impacts on caps 104, 106 of a photoconductor drum 101 with a cleaning station 302, as described above in more detail.

After block 410, once any satellite systems have been disengaged from the removable drum 101 and the removable drum 101 has been controlled to cease rotation, method 450 includes block 456 which comprises outputting a notification that the removable drum 101 is ready for removal. In some examples, the method may further comprise removing the removable drum 101 from the printing apparatus 100.

Figure 6:
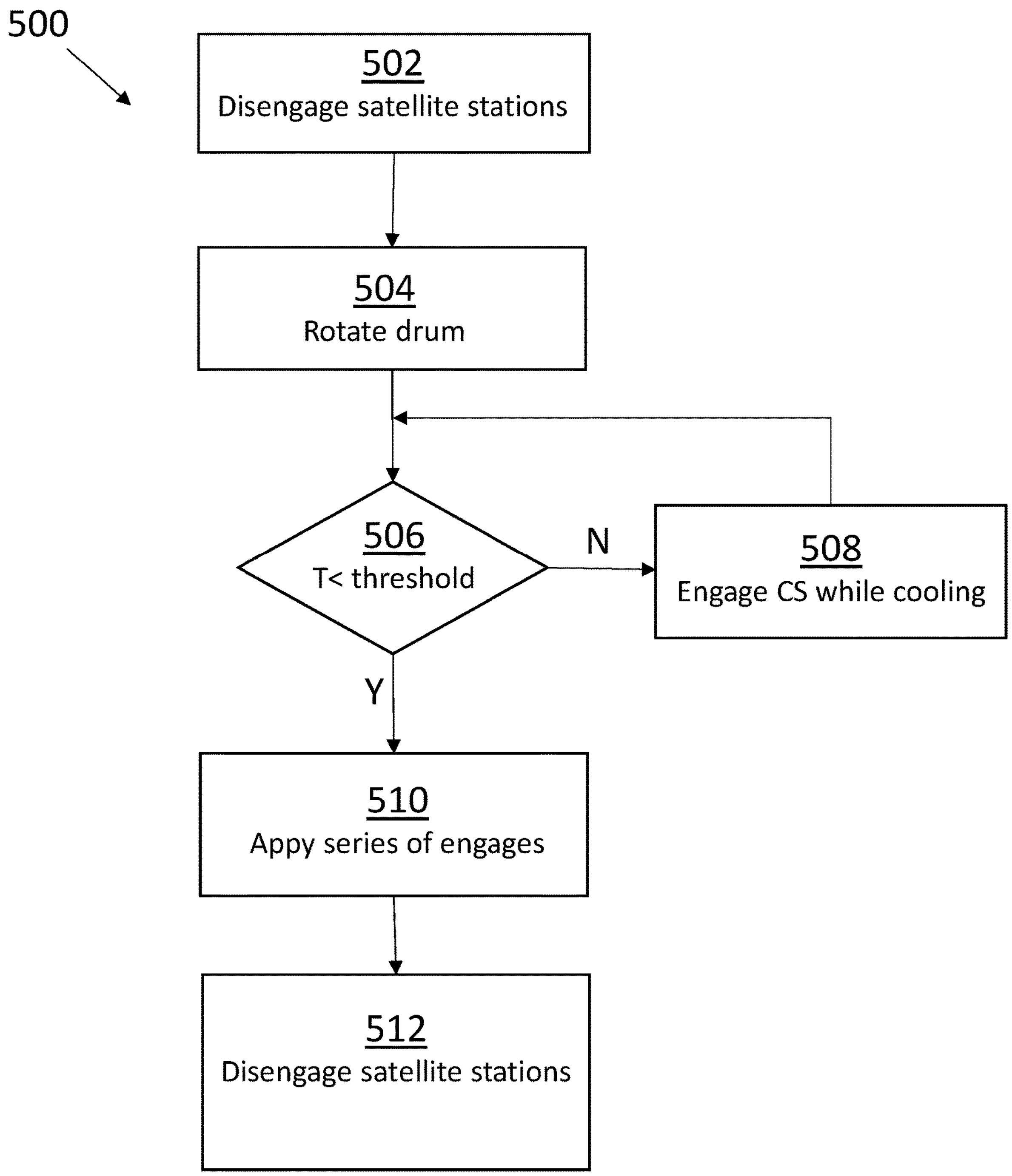
FIG. 6 shows a schematic representation of another example method, which may be a method of preventing binding of a removable drum of a printing apparatus.

In some examples, the printing apparatus 100 may be to perform a binding prevention sequence in addition to the drum removal sequence 400 or 450. FIG. 6 shows an example method 500, which may be a binding prevention sequence. Printing apparatus 100 may be to perform method 500. For example, printing apparatus 100 may be to perform method 500 in addition to, or in combination with method 400 or method 450. In some examples, method 500 may be performed prior to performing method 400 or 450. For example, printing apparatus may be to perform method 500 initially, and may then switch to performing method 400 or method 450 in response to an indication that a removable drum 101 of the printing apparatus 100 is to be removed.

Block 502 of method 500 comprises controlling a print apparatus 100 to disengage all satellite components (i.e. any satellite components that are currently engaged with the removable drum 101). Block 504 of method 500 comprises rotating a removable drum 101. For example, block 504 may comprise rotating the removable drum 101 at a speed of less than or equal to the nominal working speed of the removable drum 101 during printing operations. In some examples, the binding prevention method 500 may include blocks 502 and 504. This can enable binding prevention by reducing non-uniform cooling, while avoiding excess wear on the removable drum 101. This method can also be used e.g. during a pause in printing while the printing apparatus 100 is still performing a print operation or about to perform a print operation, so cooling the removable drum 101 down from the working printing temperature is not suitable.

In some examples, the method 500 may include additional blocks 506 to 512. In some examples, the method 500 includes determining whether the printing apparatus 100 is currently printing or about to print and if printing is not taking place, or about to take place, the method 500 may proceed to block 506. Block 506 comprises determining whether a temperature of the removable drum 101 (e.g. an average surface temperature) is below a second predefined temperature. The second predefined temperature may be less than an internal press ambient temperature of the printing apparatus. In some examples, the second predefined temperature may be s 30° C. In some examples, the second predefined temperature may be e.g. 24° C.

If it is determined that the removable drum temperature is below the second predefined temperature, method 500 may progress to block 510. If it is determined that the photoconductor drum temperature is above the second predefined temperature, the method 500 may progress to block 508.

Block 508 comprises continuously engaging a cleaning station 302 with the removable drum 101 while rotating the removable drum 101 (i.e. for a full rotation, or a plurality of rotations of the removable drum 101). Block 508 also comprises controlling a cooling system of the cleaning system 302 to cool the removable drum 101, e.g. as described above.

Block 510 comprises controlling one or a plurality of satellite components to perform a series of engagements and disengagements with the removable drum 101.

Block 512 comprises disengaging all satellite components around the removable drum 101. In some examples, method 500 may further comprise ceasing rotation of the removable drum 101.

In some examples, method 500 may be performed periodically to prevent binding occurring. For example, method 500 may be performed after a set amount of time has passed, or each time a print job is completed.

Figure 7:
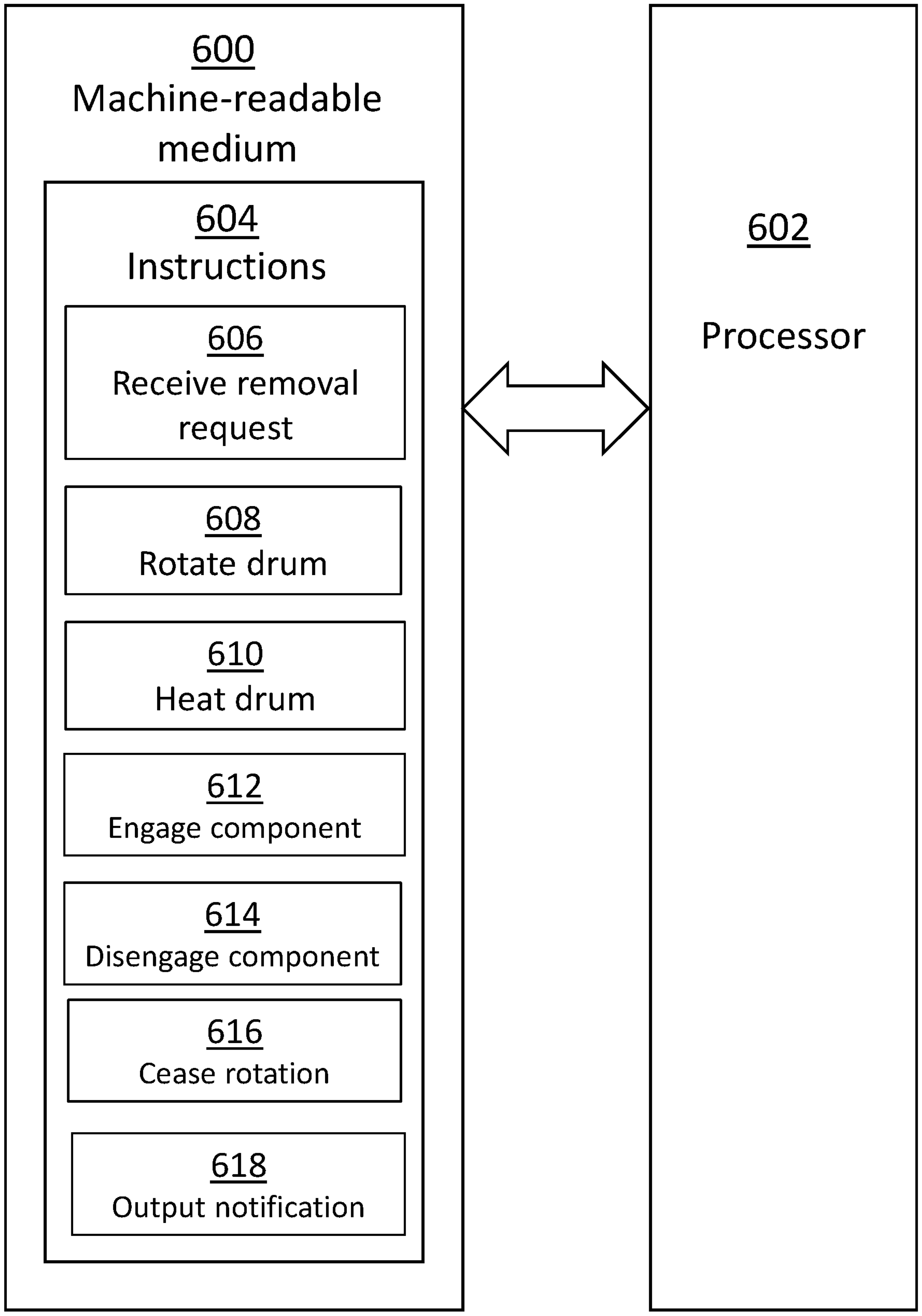
FIG. 7 shows a schematic representation of a machine-readable medium in association with a processor.

FIG. 7 shows a machine-readable medium 600 in association with a processor 602. In some examples, the controller of FIG. 1 may comprise the machine-readable medium 600 and the processor 602. The machine-readable medium 600 may store instructions to cause the processor 602 to perform the method of FIG. 4 and/or the method of FIG. 5.

The machine-readable medium 600 comprises instructions 604 to be executed by the processor. These instructions 604 include instructions 606 to receive a request to prepare a removable drum 101 (which may be a removable photoconductor drum) of a printing apparatus 100 for removal. Instructions 608 are to cause the processor 602 to control the printing apparatus 100 to rotate the removable drum 101. Instructions 610 are to cause the processor 602 to control a heater to heat the removable drum 101 to a first threshold temperature. Instructions 612 are to cause processor 602 to control a component 110 of the printing apparatus 100 to engage with the removable drum 101. For example, instructions 612 may be to control a component of the printing apparatus 100 to continuously engage with the removable drum 101 as described above in more detail. Instructions 604 may also comprise instructions to perform a series of engagements between a component or components of the printing apparatus 100 and the removable drum 101, as described above in more detail.

Instructions 614 are to cause processor 602 to control the printing apparatus 100 to disengage the component or components from the removable drum 101. Instructions 616 are to cause processor 602 to control the printing apparatus 100 to cease rotation of the removable drum 101. Instructions 618 are to cause processor 602 to control the printing apparatus 100 to output a notification indicating that the removable drum 101 is ready for removal.

Figure 8:
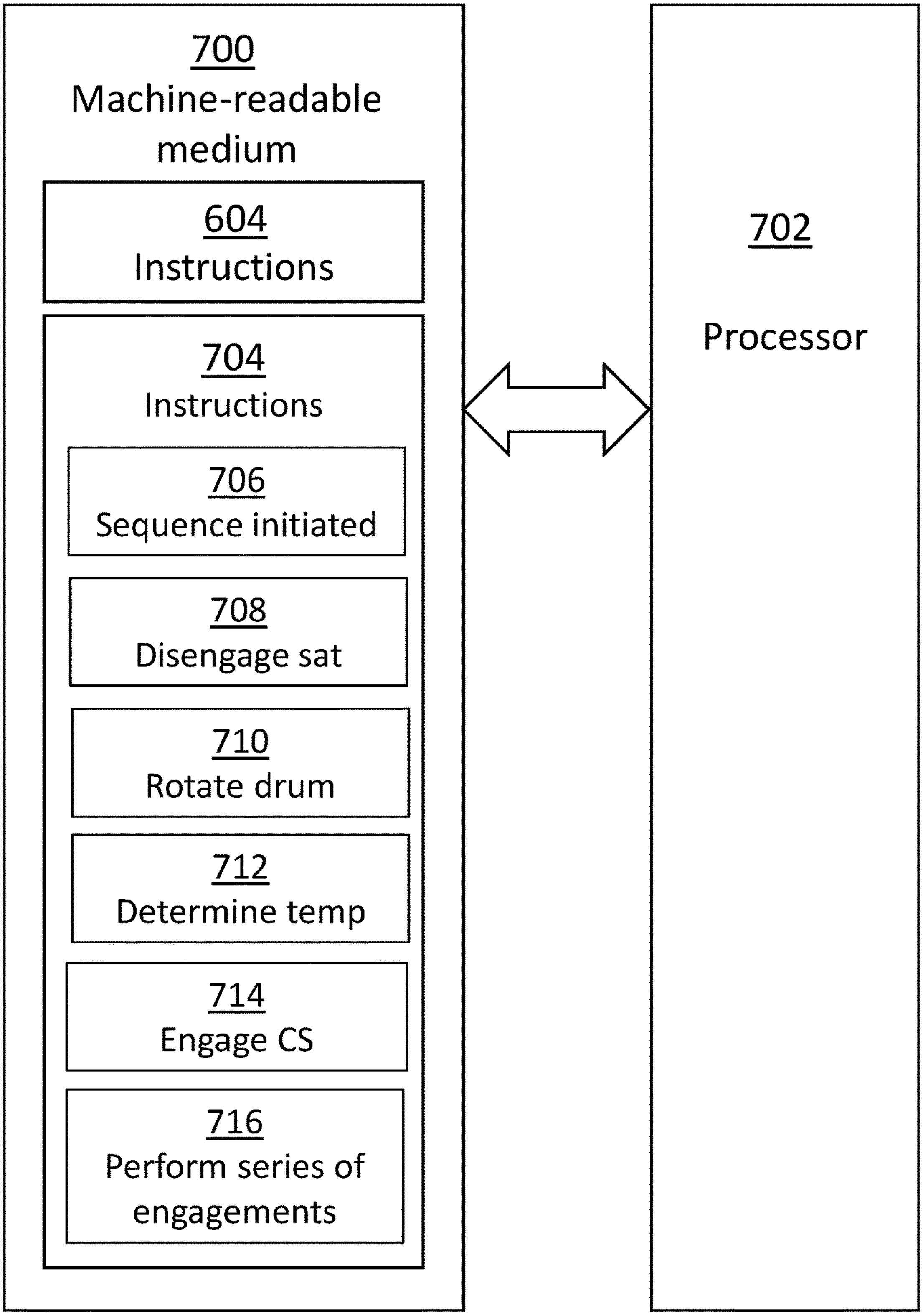
FIG. 8 shows another schematic representation of a machine-readable medium in association with a processor.

FIG. 8 shows another machine-readable medium 700 in association with a processor 702. In some examples, the controller of FIG. 1 may comprise the machine-readable medium 700 and the processor 702. The machine-readable medium 700 may store instructions to cause the processor 702 to perform the method of FIG. 4 and/or the method of FIG. 5, and/or the method of FIG. 6.

Machine-readable medium 700 may comprise instructions 604 as set out above, and comprises additional instructions 704. In some examples, instructions 704 comprise instructions 706 to determine that a binding prevention sequence is to be initiated for a removable drum 101, which may be a removable photoconductor drum. In response, instructions 708 are to control the printing apparatus 100 to disengage any components that are engaged with the removable drum. Instructions 710 are to control the printing apparatus 100 to rotate the removable drum 101.

In some examples, instructions 704 comprise instructions 712 to determine whether a temperature of the removable drum is above a second predefined temperature threshold, wherein the second predefined temperature threshold is lower than the first predefined temperature threshold. For example, the second predefined temperature threshold may be an ambient press temperature. In some examples, block 712 may include determining an ambient press temperature to determine whether the temperature of the removable drum is below the ambient press temperature. Instructions 714 are to, if the temperature of the removable drum 101 is above the second predefined temperature threshold, control the printing apparatus 100 to continuously engage a cleaning station 302 of the printing apparatus 100 with the removable drum 101 whilst rotating the removable drum 101 and whilst controlling a cooling system of the cleaning station 302 to cool the removable drum 101 until the removable drum temperature is below the second predefined temperature threshold.

In some examples, instructions 704 may include instructions 716 to, in response to determining that the temperature of the removable drum is below the predefined threshold and that the printing apparatus is not in a printing or ready-to print mode; control a component or a plurality of components of the printing apparatus 100 to perform a series of engagements with the removable drum 101.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

It shall be understood that some blocks in the flow charts can be realized using machine readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode. Further, some teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A printing apparatus comprising:

a rotatable shaft;

a removable drum mounted on the shaft;

a fixing element to fixedly couple the removable drum to the shaft, so that the removable drum is to rotate with the shaft;

a heater;

a printing apparatus satellite component located adjacent to the removable drum and engageable with the removable drum; and a controller, wherein the controller is to receive a command to prepare the removable drum for removal; and in response:

control the shaft to rotate the removable drum;

control the heater to heat the removable drum while it rotates; and control the printing apparatus to engage the satellite component of the printing apparatus with the removable drum while it rotates.

2. A printing apparatus according to claim 1, wherein the removable drum is a photoconductor drum.

3. A printing apparatus according to claim 2, wherein the satellite component of the printing apparatus is an intermediate transfer member support, and wherein the controller is to control the intermediate transfer member support to continuously engage the photoconductor drum while it rotates.

4. A printing apparatus according to claim 1 wherein the controller is to apply a series of engagements between the removable drum and the satellite component and/or wherein the controller is to apply a series of engagements between the removable drum and a plurality of satellite components of the printing apparatus.

5. A printing apparatus according to claim 4 wherein the removable drum comprises a photoconductor drum, the component comprises an intermediate transfer member drum and/or the further component or plurality of further components includes a cleaning station.

6. A printing apparatus according to claim 1 wherein the controller is further to control the printing apparatus to perform a binding prevention sequence, wherein the binding prevention sequence comprises disengaging all surrounding components from the removable drum surface and rotating the removable drum at a speed of less than or equal to the nominal working speed of the removable drum during printing operations.

7. A printing apparatus according to claim 1 wherein the printing apparatus further comprises a cleaning station and a cleaning station cooling system; and wherein the controller is further to control the printing apparatus to perform a binding prevention sequence, wherein the binding prevention sequence comprises:

continuously engaging the cleaning station with the removable drum while rotating the removable drum; and simultaneously:

controlling the cleaning station cooling system to cool the removable drum.

8. A method for preparing a removable drum of a printing apparatus for removal comprising:

receiving an indication that the removable drum is to be removed; and in response:

controlling the printing apparatus to rotate the removable drum, while controlling a heater to heat the removable drum to a first predefined temperature threshold; and controlling a satellite component of the printing apparatus to engage with the removable drum; and controlling the satellite component to disengage from the removable drum and cease rotating the removable drum.

9. A method according to claim 8 further comprising, after ceasing rotation of the removable drum, outputting a notification that the removable drum is ready for removal.

10. A method according to claim 8, wherein the first predefined temperature is above 35° C.

11. A method according to claim 8, further comprising, once the removable drum has reached the first predefined temperature threshold, performing a series of engagements between a satellite component, or a plurality of satellite components, and the removable drum.

12. A machine-readable medium comprising instructions which, when executed by a processor, cause the processor to:

receive a request to prepare a removable drum of a printing apparatus for removal, and, in response:

control the printing apparatus to rotate the removable drum, control a heater to heat the removable drum to a first temperature threshold; and control a component of the printing apparatus to engage with the removable drum; then control the printing apparatus to:

disengage the component;

cease rotating the removable drum; and output a notification indicating that the removable drum is ready for removal.

13. A machine-readable medium according to claim 12, further comprising instructions which, when executed by the processor, cause the processor to:

determine that a binding prevention sequence is to be initiated, and in response:

disengage any components that are engaged with the removable drum; and rotate the removable drum.

14. A machine-readable medium according to claim 13, further comprising instructions to:

determine whether a temperature of the removable drum is above a second predefined temperature threshold, wherein the second predefined temperature threshold is lower than the first predefined temperature threshold; and if the temperature of the removable drum is above the second predefined temperature threshold:

control the printing apparatus to continuously engage a cleaning station of the printing apparatus with the removable drum whilst rotating the removable drum and whilst controlling a cooling system of the cleaning station to cool the removable drum, until the removable drum temperature is below the second predefined temperature threshold.

15. A machine-readable medium according to claim 14, wherein the instructions are further to:

determine that the temperature of the removable drum is below the predefined threshold and that the printing apparatus is not in a printing or ready-to print mode; and control a component or a plurality of components of the printing apparatus to perform a series of engagements with the removable drum.

* * * * *